(12) United States Patent
Cook et al.

(10) Patent No.: US 9,292,399 B2
(45) Date of Patent: *Mar. 22, 2016

(54) DESIGN-BASED WEIGHTING FOR LOGIC BUILT-IN SELF-TEST

(71) Applicant: International Business Machines Corporation, Armonk, NY (US)

(72) Inventors: Gregory J. Cook, Raleigh, NC (US); Timothy J. Koprowski, Newburgh, NY (US); Mary P. Kusko, Hopewell Junction, NY (US); Cedric Lichtenau, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,122

(22) Filed: Sep. 30, 2014

(65) Prior Publication Data

US 2015/0168489 A1 Jun. 18, 2015

Related U.S. Application Data

(63) Continuation of application No. 14/105,285, filed on Dec. 13, 2013.

(51) Int. Cl.
*G06F 11/27* (2006.01)
*G01R 31/3187* (2006.01)
*G06F 17/50* (2006.01)

(52) U.S. Cl.
CPC ............... *G06F 11/27* (2013.01); *G06F 17/50* (2013.01); *G01R 31/3187* (2013.01)

(58) Field of Classification Search
CPC ............. G01R 31/311; G01R 31/318385; G01R 31/318533; G01R 31/318536; G01R 31/318544; G01R 31/3177; G01R 31/3187; G06F 11/27; G11C 29/32
USPC ................. 714/733, 726, 729, 724, 732, 734, 714/E11.155, 30, 715, 728, 739; 703/14
See application file for complete search history.

(56) References Cited

U.S. PATENT DOCUMENTS

| | | | |
|---|---|---|---|
| 6,671,838 B1 | 12/2003 | Koprowski et al. | |
| 6,816,990 B2 | 11/2004 | Song et al. | |
| 7,197,721 B2 | 3/2007 | Patil et al. | |
| 7,475,000 B2* | 1/2009 | Cook et al. | 703/14 |
| 7,681,098 B2 | 3/2010 | Kiryu | |
| 2003/0145263 A1 | 7/2003 | Song et al. | |
| 2004/0230882 A1 | 11/2004 | Huott et al. | |
| 2015/0169423 A1* | 6/2015 | Cook et al. | 714/733 |

* cited by examiner

*Primary Examiner* — Phung M Chung
(74) *Attorney, Agent, or Firm* — Cantor Colburn LLP; Margaret McNamara

(57) ABSTRACT

Embodiments relate to design-based weighting for logic built-in self-test (LBIST). An aspect includes a computer program product for implementing design-based weighting for LBIST. The computer program product includes a tangible storage medium readable by a processing circuit and storing instructions for execution by the processing circuit for performing a method. The method includes analyzing, by the processing circuit, a plurality of integrated circuit design organizational units to determine preferred weightings of the integrated circuit design organizational units that provide a highest level of failure coverage when applied to a random pattern generator. Based on determining the preferred weightings, the processing circuit creates an integrated circuit layout that includes a plurality of weighted test paths to respectively apply the preferred weightings to the integrated circuit design organizational units. The integrated circuit layout is incorporated in a device under test.

14 Claims, 10 Drawing Sheets

DESIGN-BASED WEIGHTING FOR LOGIC BUILT-IN SELF-TEST

DOMESTIC PRIORITY

This application is a continuation of U.S. application Ser. No. 14/105,285 filed Dec. 13, 2013, the disclosure of which is incorporated by reference herein in its entirety.

BACKGROUND

The present invention relates generally to integrated circuit testing, and more specifically, to design-based weighting for logic built-in self-test (LBIST).

LBIST is used to test integrated circuit logic of high-end servers and computers. LBIST is used at all levels of test including: integrated circuit, multi-chip module (MCM), and system levels. Conceptually, the LBIST approach is based on the realization that much of a circuit tester's electronics is semi-conductor based, just like the devices under test, and that many of the challenges and limitations of testing lie in the interface to the Device Under Test (DUT). The LBIST approach can be described as an attempt to move many of the already semiconductor-based test equipment functions into the DUT and eliminate complex interfacing. One of the major advantages LBIST has over other means of testing logic is that operation of the test is self-contained. All of the circuitry required to execute the test at-speed is contained within the integrated circuit. Very limited external controls are needed, so LBIST can be run at all levels of packaging (e.g., wafer, module and system) without requiring expensive external test equipment.

LBIST utilizes what is commonly referred to as Self-Test Using Multiple Signal Registers and Pseudo-Random Pattern Generators (STUMPS) architecture. The major components of LBIST include: a pseudo-random pattern generator (PRPG) used to generate the test patterns; a multiple input signature register (MISR) to compress the test results; and the self-test control macro (STCM) that is used to apply clocks and controls to the PRPG, MISR and system logic to perform the test. The PRPG applies test data to the system logic via multiple parallel scan chains, which are connected between the PRPG and MISR.

One of the limitations of LBIST is the maximum achievable test coverage. Because the PRPG is implemented using a linear feedback shift register (LFSR) that generates random patterns (i.e., 50% chance of being a 0 or a 1), certain random resistant structures are difficult, if not impossible, to test. Examples include very wide AND gates or OR gates where the probability of all inputs being a 1 in the case of an AND gate or all inputs being a 0 in the case of an OR gate is very small. Typically, LBIST test coverage peaks at around 96%. The remaining faults must be tested by some other means of logic test, either weighted random pattern test (WRPT), deterministic test, or a combination of both.

Weighting is a technique where patterns can be biased towards a 0 or 1 state by ANDing or ORing multiple bits of an LFSR together. Instead of a 50% chance of a 0 or a 1, the odds of a 0 or 1 are weighted to increase the probability of one or the other occurring. For example, if 3 random bits are ORed together, the resultant output has a 7/8 chance of being a 1. Conversely, if 4 random bits are ANDed together, the output has a 1/16 chance of being a 1. This weighting technique can be used to test random resistant structures such as large AND or OR structures.

In contemporary designs, many LBIST variations are used in manufacturing tests employing different weights. As one example, U.S. Pat. No. 6,671,838, "Method and Apparatus for Programmable LBIST Channel Weighting" filed Sep. 27, 2000, which is incorporated herein by reference, teaches a built-in self-test (BIST) method and apparatus for testing logic circuits on an integrated circuit, where a random resistant fault analysis (RRFA) program is used to determine weighting requirements on a per channel basis. In U.S. Pat. No. 6,671,838, weighting requirements from the RRFA program are applied to random test pattern data resulting in weighted test pattern data that is programmably applied to a scan chain.

SUMMARY

An aspect includes a computer program product for implementing design-based weighting for logic built-in self-test (LBIST). The computer program product includes a tangible storage medium readable by a processing circuit and storing instructions for execution by the processing circuit for performing a method. The method includes analyzing, by the processing circuit, a plurality of integrated circuit design organizational units to determine preferred weightings of the integrated circuit design organizational units that provide a highest level of failure coverage when applied to a random pattern generator. Based on determining the preferred weightings, the processing circuit creates an integrated circuit layout that includes a plurality of weighted test paths to respectively apply the preferred weightings to the integrated circuit design organizational units. The integrated circuit layout is incorporated in a device under test.

According to another aspect, a computer-implemented method for implementing design-based weighting for LBIST includes analyzing, by a processing circuit, a plurality of integrated circuit design organizational units to determine preferred weightings of the integrated circuit design organizational units that provide a highest level of failure coverage when applied to a random pattern generator. Based on determining the preferred weightings, the processing circuit creates an integrated circuit layout that includes a plurality of weighted test paths to respectively apply the preferred weightings to the integrated circuit design organizational units. The integrated circuit layout is incorporated in a device under test.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In exemplary embodiments, design-based weighting for logic built-in self-test (LBIST) is provided, where preferred weightings of the integrated circuit design organizational units are determined and an integrated circuit layout is created based on the preferred weightings. Rather than analyzing a design after the integrated circuit layout is finalized, embodiments perform analysis during the design process and ensure that preferred weightings are included. Where the integrated circuit design organizational units are macros, the macros can be assigned to scan chains or LBIST channels that include the preferred weighting of each respective macro. If the integrated circuit design organizational units are Self-Test Using Multiple Signal Registers and Pseudo-Random Pattern Generators (STUMPS) channels, the analyzing can be performed on a STUMPS channel basis, and the integrated circuit layout is updated to include the preferred weightings of each STUMPS channel.

In one embodiment, design for test (DFT) macro analysis is used to determine the preferred weightings per macro during an integrated circuit design process. The macros can be assigned to STUMPS channels that enable each macro to receive its preferred weighting as test input based on the preferred weightings determined during the DFT macro analysis. The preferred weightings represent weightings that provide a highest level of test coverage. By first learning the preferred weightings and then establishing an integrated circuit layout that enables routing of the preferred weightings to respective integrated circuit design organizational units, LBIST patterns can achieve a higher percentage of test coverage. The preferred weightings need not be limited to only a few options, such as 1/8 weighting and 7/8 weighting, but can include arbitrary weightings that provide the highest level of test coverage, such as a 1/16 weighting, 15/16 weighting, 1/32 weighting, 31/32 weighting, and so forth.

In another embodiment, the DFT analysis is performed after the STUMPS channels are assigned. In this case, the DFT analysis is done on the existing STUMPS channels, and the preferred weightings are established based on this data. The preferred weightings can be hard coded for each STUMPS channel or provided as a selectable input, e.g. as a multiplexer input, where other non-weighted inputs or non-preferred weighted inputs can also be made available for testing.

In a further embodiment, after determining preferred weightings for a design, a complete LBIST channel can be assigned for each unique instance of the preferred weightings. Integrated circuit design organizational units, such as macros, can be assigned to a corresponding LBIST channel based on the preferred weightings of the respective macros.

Figure 1:
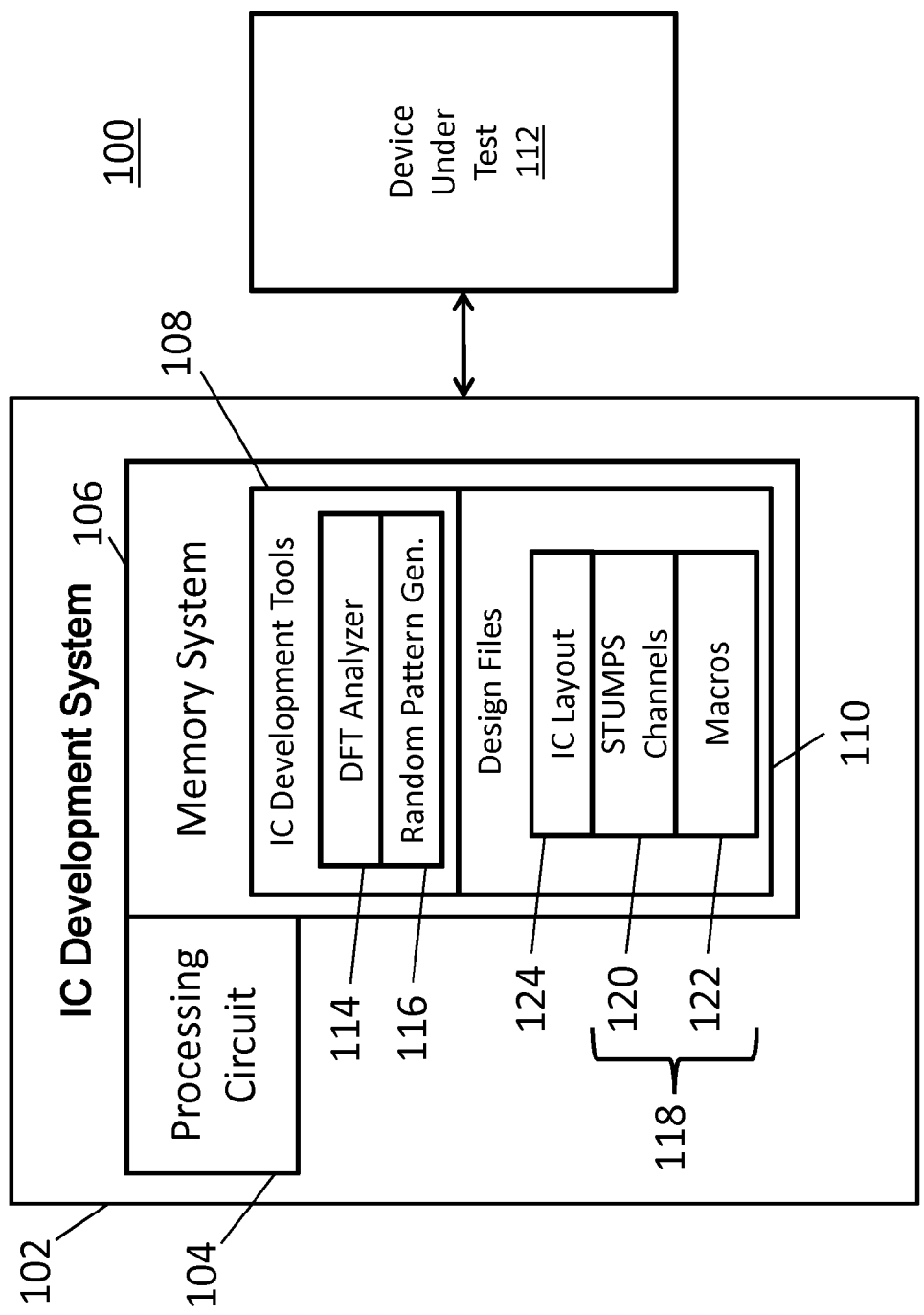
FIG. 1 depicts a system for providing design-based weighting for logic built-in self-test in accordance with an embodiment.

Turning now to FIG. 1, a system 100 is generally shown that includes an integrated circuit (IC) development system 102 configured to incorporate an integrated circuit layout into a device under test (DUT) 112. The IC development system 102 can fabricate the DUT 112 as an integrated circuit chip. The DUT 112 can be distributed by the fabricator in raw wafer form (that is, as a single wafer that has multiple unpackaged chips), as a bare die, or in a packaged form. In the latter case the DUT 112 can be mounted in a single chip package (such as a plastic carrier, with leads that are affixed to a motherboard or other higher level carrier) or in a multichip package (such as a ceramic carrier that has either or both surface interconnections or buried interconnections). The DUT 112 may also be integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. An exemplary design flow for developing the DUT 112 is described in greater detail herein with respect to FIG. 9.

Continuing with the description of FIG. 1, the IC development system 102 includes a processing circuit 104 and a memory system 106. The processing circuit 104 can be any type of processor or microcontroller, including multiple instances thereof, that is configurable to execute processes further described herein, where the memory system 106 is an example of a tangible storage medium. The memory system 106 can include IC development tools 108 and design files 110. The IC development tools 108 may be partitioned as one or more computer program products. For example, the IC development tools 108 can include a DFT analyzer 114 and a random pattern generator 116 among other executable applications (not depicted). The design files 110 can include definition files for a plurality of integrated circuit design organizational units 118, such as STUMPS channels 120 and macros 122. The STUMPS channels 120 can include the macros 122 organized in scan chains. The macros 122 define logic circuits that can include latches and logic blocks (e.g., logic gates) organized to implement a particular function, such as an arithmetic logic unit macro, an error checking macro, a decoding macro, etc.

In an exemplary embodiment, the processing circuit 104 is coupled to the memory system 106, and the processing circuit 104 is configured to execute the IC development tools 108 to analyze a plurality of integrated circuit design organizational units 118 defined in the design files 110 to determine preferred weightings of the integrated circuit design organizational units 118 that provide a highest level of failure coverage when applied to the random pattern generator 116 of the IC development tools 108. For example, the DFT analyzer 114 can iterate over a large range of possible weightings to identify the preferred weightings of the integrated circuit design organizational units 118, e.g., 1/2, 1/4, 3/4, 1/8, 7/8, 1/16, 15/16, 1/32, 31/32, 1/64, 63/64, 1/128, 127/128, 1/256, 255/256, and so forth. Based on determining the preferred weightings, the processing circuit 104 creates an integrated circuit layout 124 that includes a plurality of weighted test paths to respectively apply the preferred weightings to the integrated circuit design organizational units 118. The integrated circuit layout 124 can be stored in the design files 110, and at least one of the design files 110 associated with the integrated circuit layout 124 can be modified to annotate the preferred weightings of the integrated circuit design organizational units 118 in the design files 110. The integrated circuit layout 124 is incorporated in the DUT 112, for example, as a design structure as described herein with respect to FIG. 9.

Figure 2:
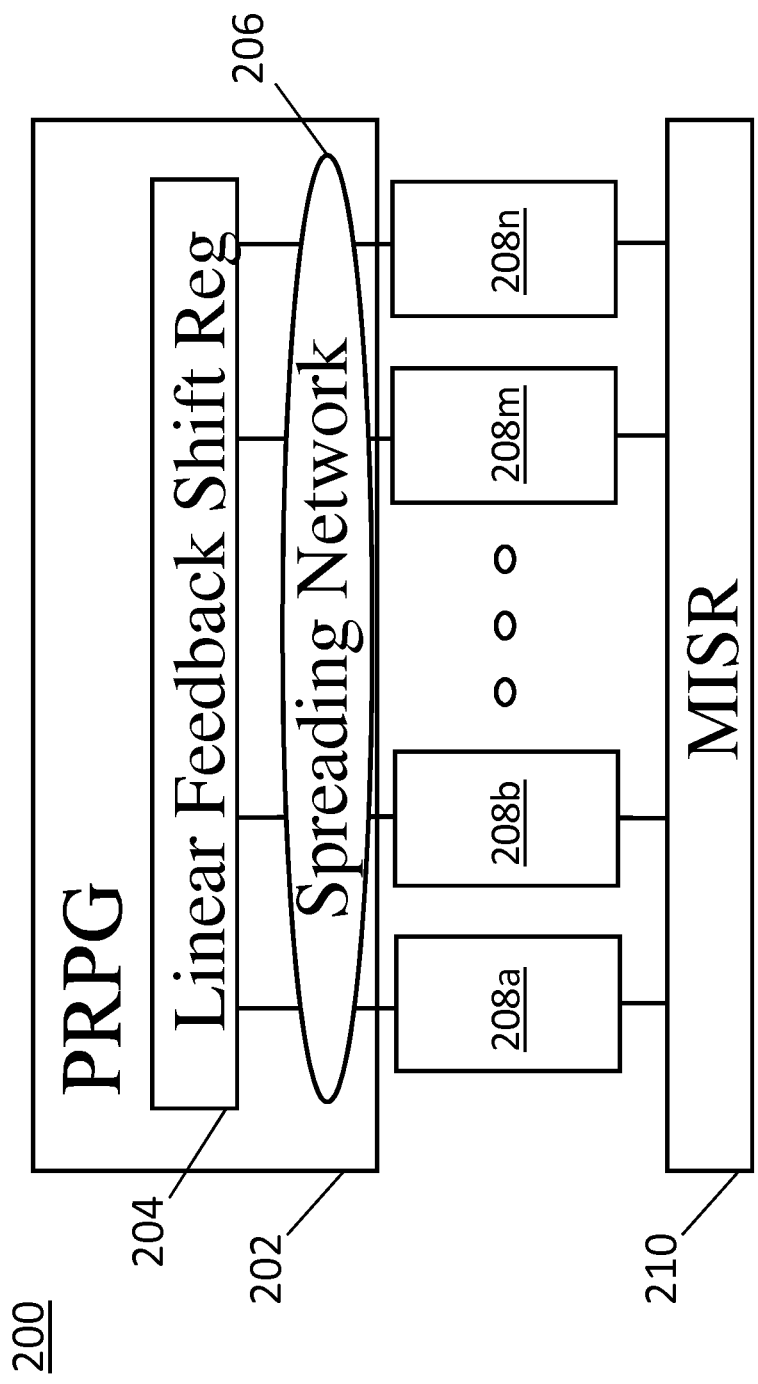
FIG. 2 depicts a design structure in accordance with an embodiment.

FIG. 2 depicts a design structure 200 in accordance with an embodiment. The design structure 200 illustrates a portion of the DUT 112 of FIG. 1 as a block diagram. The design structure 200 of FIG. 2, includes a pseudo-random pattern generator (PRPG) 202 including a linear feedback shift register (LFSR) 204 that generates random patterns (i.e., 50% chance of being a 0 or a 1) and distributes the random patterns via a spreading network 206 to a plurality of scan chains 208a, 208b, . . . , 208m, 208n. The scan chains 208a-208n provide test paths through partial or complete instances of the macros 122 of FIG. 1 as embodied in the DUT 112 of FIG. 1. A multiple input signature register (MISR) 210 compresses the test results to confirm that failures are detected in a summarized format. Although several examples provided herein refer to use of a MISR, other result compression structures known in the art can be substituted in various embodiments, such as an XOR compression register. Exemplary embodiments include incorporating preferred weightings for the scan chains 208a-208n into the design structure 200 to provide a highest level of fault coverage over a shortest amount of time. The preferred weightings may be integrated into the spreading network 206 such that each of the scan chains 208a-208n receives its preferred weighting.

Figure 3:
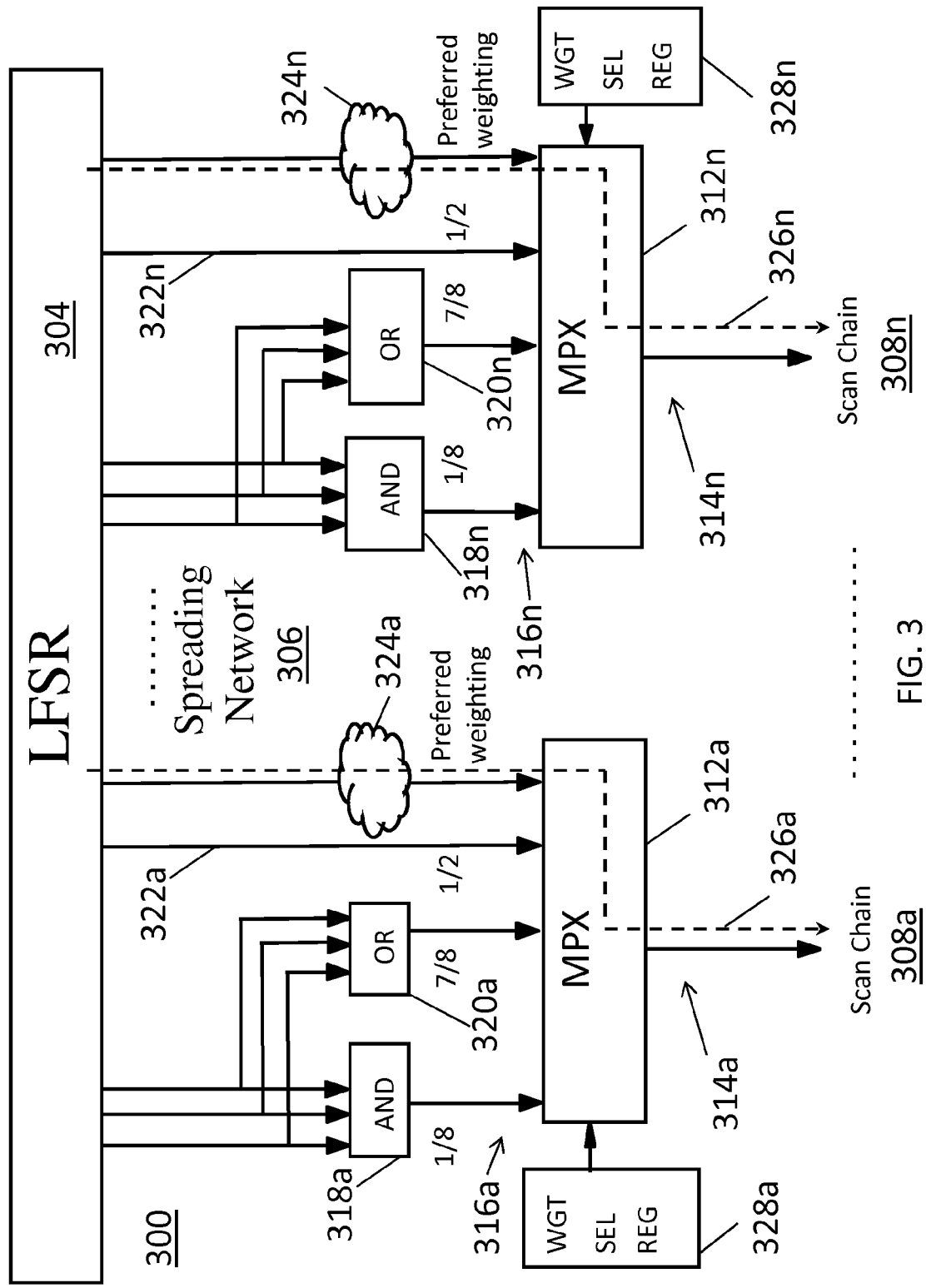
FIG. 3 depicts another design structure in accordance with an embodiment.

FIG. 3 depicts another design structure 300 in accordance with an embodiment. In the example of FIG. 3, the design structure 300, which may be implemented in the DUT 112 of FIG. 1, includes an LFSR 304, a spreading network 306, and a plurality of scan chains 308a-308n. A plurality of multiplexers 312a-312n are incorporated in the spreading network 306 to establish different weightings for scan chains 308a-308n. Each combination of a multiplexer 312 and a scan chain 308 may be referred to as a STUMPS channel 314. Accordingly, the example of FIG. 3 includes STUMPS channels 314a-314n. Each of the multiplexers 312 has a number of multiplexer inputs 316.

As depicted in FIG. 3, multiplexer 312a includes four multiplexer inputs 316a as a 1/8 weighted input, a 7/8 weighted input, a non-weighted input, and a preferred weighting input. The 1/8 weighted input of the multiplexer inputs 316a may be generated by an AND-gate 318a, as only one of eight possible input combinations results in a logical '1'. The 7/8 weighted input of the multiplexer inputs 316a may be generated by an OR-gate 320a, as seven of eight possible input combinations result in a logical '1'. A direct link 322a between the LFSR 304 and the multiplexer 312a provides a non-weighted input with an implied weighting of 1/2, as the LFSR 304 generates random patterns with a 50% chance of a logical '1'. A preferred weighting 324a can be generated in a similar manner as the 1/8 and 7/8 weights, such as a four input AND-gate for a 1/16 weight or a five input OR-gate for a 31/32 weight, etc. It will be understood that any circuit capable of producing a weighting can be used in various embodiments as described herein, and weighting (preferred or otherwise) is not limited to the use of AND-gates and OR-gates. A weighted test path 326a is defined between the LFSR 304, the preferred weighting 324a, the multiplexer 312a, and the scan chain 308a to apply to the preferred weighting 324a to the integrated circuit design organizational units 118 of FIG. 1 embodied in the scan chain 308a.

A similar layout is repeated in the design structure 300 to test additional STUMPS channels 314. For example, for STUMPS channel 314n, multiplexer 312n includes four multiplexer inputs 316n as a 1/8 weighted input, a 7/8 weighted input, a non-weighted input, and a preferred weighted input. The multiplex inputs 316n are generated by AND-gate 318n, OR-gate 320n, direct link 322n, and preferred weighting 324n. A weighted test path 326n is defined between the LFSR 304, the preferred weighting 324n, the multiplexer 312n, and the scan chain 308n to apply to the preferred weighting 324n to the integrated circuit design organizational units 118 of FIG. 1 embodied in the scan chain 308n. While each of the multiplexers 312a-312n are depicted as having the same multiplexer inputs 316a-316n at the same multiplexer input position, i.e., 1/8, 7/8, 1/2, and preferred weighting positions, the values of the preferred weightings 324a-324n can vary. For example, the preferred weightings 324a and 324n may both be assigned as at a first multiplexer input position (e.g., channel 0) on respective multiplexers 312a and 312n, the weighting values produced by the preferred weightings 324a and 324n can be different, such as 15/16 and 1/64. Each multiplexer 312a-312n may have a respective weight selection register 328a-328n to enable independent routing of weights per STUMPS channel 314a-314n.

Figure 3A:
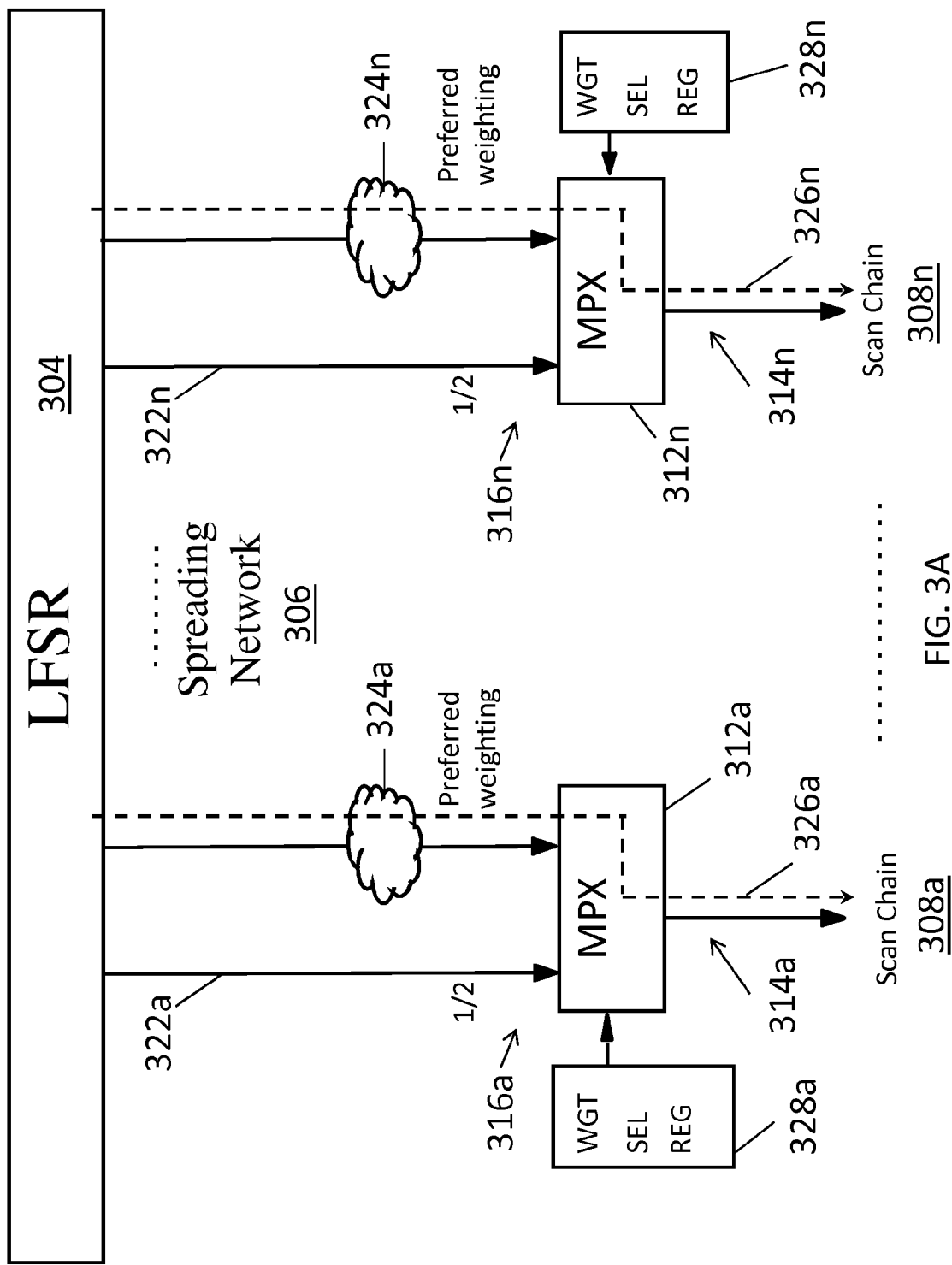
FIG. 3A depicts a variation of the design structure of FIG. 3 in accordance with an embodiment.

If a given integrated circuit design has a large number of different preferred weightings, e.g., more than four, modifying the IC layout 124 of FIG. 1 to align the preferred weightings with corresponding integrated circuit design organizational units 118 of FIG. 1 results in a greater level of test coverage while also keeping the multiplexers 312a-321n and respective weight selection registers 328a-328n relatively compact such that each STUMPS channel 314a-314n need not support all weighting permutations. While only four multiplexer inputs 316a-316n are depicted for each multiplexer 312a-312n with specific example weights provided, it will be understood the multiplexer 312a-312n can support a different number of multiplexer inputs 316a-316n with different weights beyond those depicted in FIG. 3. For example, different or additional weights such as 1/4, 3/4, 1/16, 15/16, 1/32, 31/32, etc. can be included in various embodiments. Furthermore, as depicted in the example of FIG. 3A, fewer multiplexer inputs 316a-316n (e.g., two) can be provided to each multiplexer 312a-312n. Upon incorporating the preferred weightings 324a and 324n, other weights can be removed from the spreading network 306, such as the 1/8 and 7/8 weighted inputs (see FIG. 3 vs. FIG. 3A) to reduce overall LBIST circuitry and use narrower instances of the multiplexer 312a-312n and weight selection registers 328a-328n.

Figure 4:
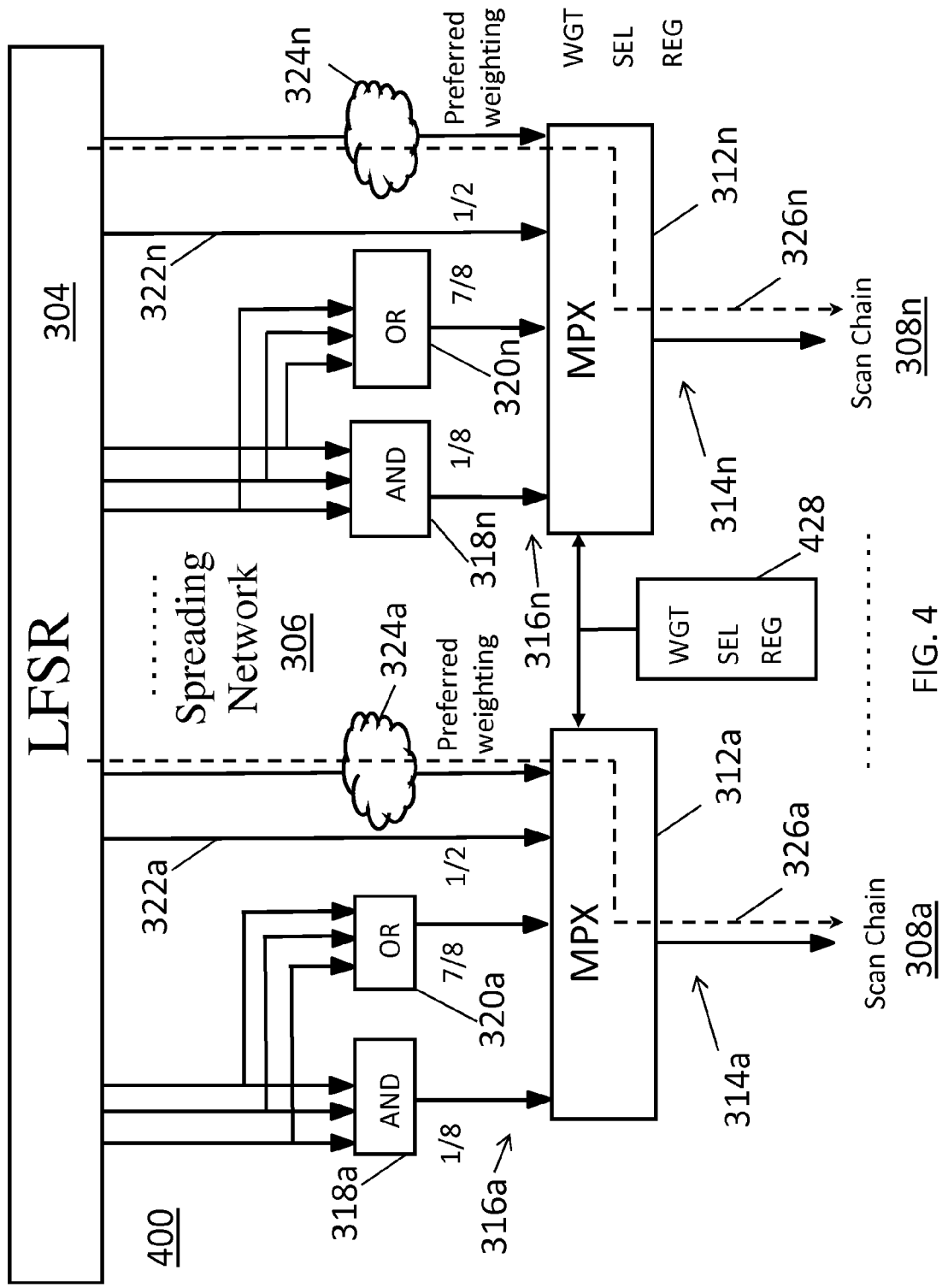
FIG. 4 depicts an alternate embodiment of the design structure of FIG. 3 in accordance with an embodiment.

FIG. 4 depicts an alternate embodiment of the design structure 300 of FIG. 3 in accordance with an embodiment as design structure 400. Similar to the design structure 300 of FIG. 3, the design structure 400 of FIG. 4 includes LFSR 304, spreading network 306, scan chains 308a-308n, multiplexers 312a-312n, STUMPS channels 314a-314n, multiplexer inputs 316a-316n, AND-gates 318a-318n, OR-gates 320a-320n, direct links 322a-322n, preferred weightings 324a-324n, and weighted test paths 326a-326n. Where the same multiplexer inputs 316a-316n are routed to the same multiplexer input position, i.e., 1/8, 7/8, 1/2, and preferred weighting positions, on the multiplexers 312a-312n, a common weight selection register 428 can be used for two or more of the multiplexers 312a-312n. In the example of FIG. 4, the preferred weightings 324a-324n are assigned to a same multiplexer input position across a plurality of multiplexers 312a-314n such that selection of the same multiplexer input position for the multiplexers 312a-314n results in selecting the preferred weightings 324a-324n across the multiplexers 312a-312n at the same time.

The common weight selection register 428 can further increase test speed as fewer write operations may be needed to establish a particular testing mode. For instance, a preferred weighting testing mode can be defined as selecting the preferred weighting 324a-324n from at least two of the multiplexers 312a-312n at the same multiplexer input position at the same time. While only four multiplexer inputs 316a-316n are depicted for each multiplexer 312a-312n with specific example weights provided, it will be understood the multiplexer 312a-312n can support a different number of multiplexer inputs 316a-316n with different weights beyond those depicted in FIG. 4. Similar to FIG. 3A, fewer multiplexer inputs 316a-316n (e.g., two) can be provided to each multiplexer 312a-312n including, for instance, only the direct links 322a-322n and preferred weightings 324a and 324n.

Figure 5:
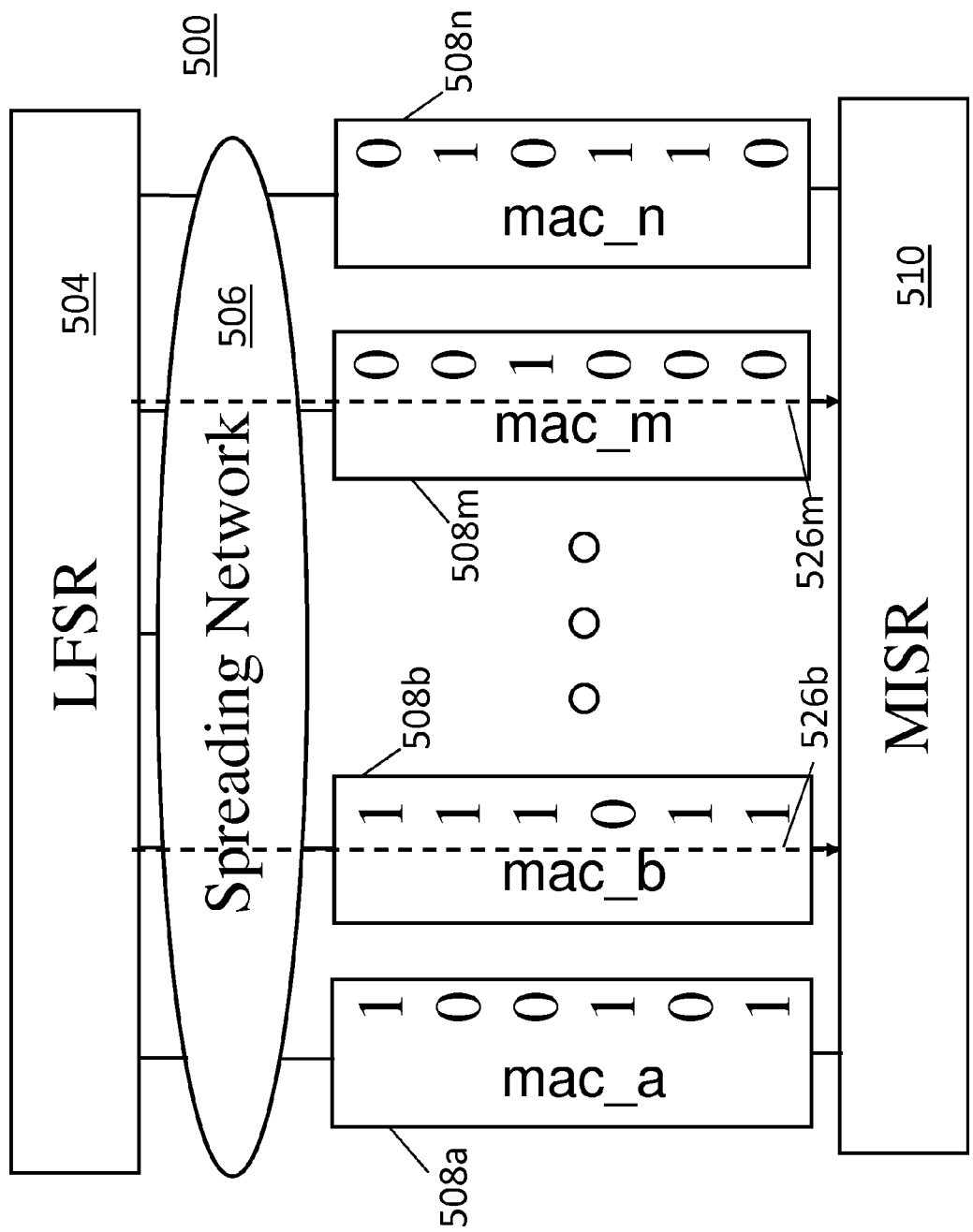
FIG. 5 depicts an additional design structure in accordance with an embodiment.

FIG. 5 depicts an additional design structure 500 in accordance with an embodiment. The design structure 500 illustrates an embodiment of a portion of the DUT 112 of FIG. 1 as a block diagram. Similar to the example of FIG. 2, the design structure 500 of FIG. 5 includes an LFSR 504 that generates random patterns (i.e., 50% chance of being a 0 or a 1) and distributes the random patterns via a spreading network 506 to a plurality of scan chains 508a, 508b, ..., 508m, 508n. The scan chains 508a-508n provide weighted test paths through various macros 122 of FIG. 1 as embodied in the DUT 112 of FIG. 1. The MISR 510 compresses the test results to confirm that failures are detected in a summarized format.

When DFT analysis is performed using the STUMPS channels 120 of FIG. 1 as the integrated circuit design organizational units 118 of FIG. 1, the scan chains 508a-508m may already have instances of the macros 122 of FIG. 1 assigned to them. In the example of FIG. 5, scan chain 508a includes macro mac_a, scan chain 508b includes macro mac_b, scan chain 508m includes mac_m, and scan chain 508n includes macro mac_n. When the DFT analysis is performed by DFT analyzer 114 of FIG. 1 on a STUMPS channel basis, the IC layout 124 of FIG. 1 can be created as a modification that assigns preferred weightings based on an existing layout rather than reallocating the macros 122 of FIG. 1. At least one of the design files 110 of FIG. 1 may be annotated to include the preferred weightings on a STUMPS channel basis. The IC layout 124 of FIG. 1 can be created or modified based on the annotations to layout the spreading network 506 to provide the preferred weightings to each of the scan chains 508a-508n. AND-gate or OR-gate combinations can be laid out in the spreading network 506 to hard code the preferred weightings. For example, if mac_a of scan chain 508a and mac_n of scan chain 508n prefer a 1/2 weight (i.e., non-weighted), then the spreading network 506 layout can provide direct links from the LFSR 504 to scan chains 508a and 508n. If mac_b of scan chain 508b has a preferred weighting of 15/16, then the spreading network 506 layout can include an appropriate circuit (e.g., 4-input OR-gate) between the LFSR 504 and scan chain 508b to form a weighted test path 526b. Similarly, if mac_m of scan chain 508m has a preferred weighting of 1/16, then the spreading network 506 layout can include an appropriate circuit (e.g., 4-input AND-gate) between the LFSR 504 and scan chain 508m to form a weighted test path 526m.

Figure 6:
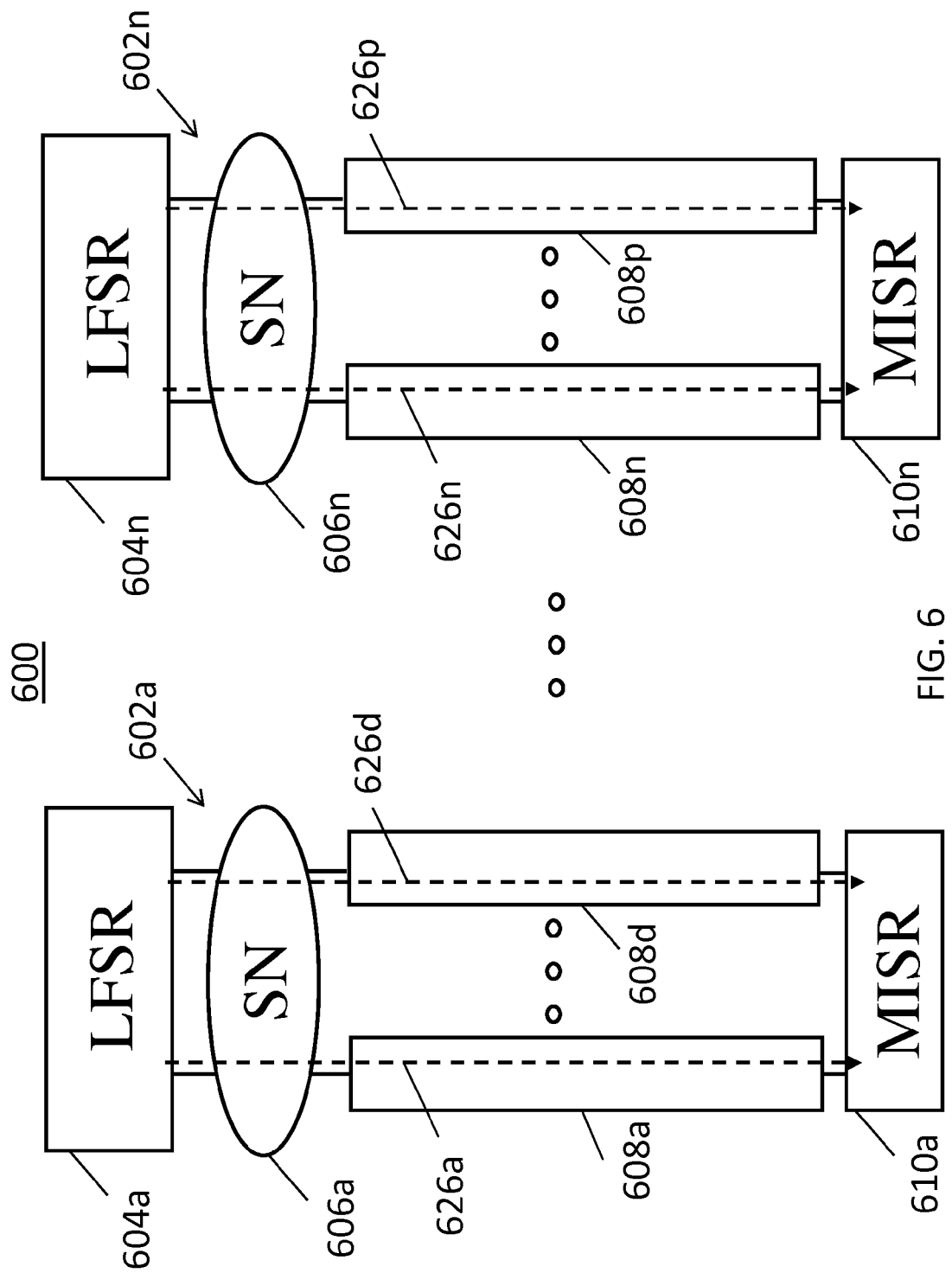
FIG. 6 depicts a further design structure in accordance with an embodiment.

FIG. 6 depicts a further design structure 600 in accordance with an embodiment. The design structure 600 illustrates an embodiment of a portion of the DUT 112 of FIG. 1 as a block diagram. In FIG. 6, separate LBIST channels 602 for each unique instance of the preferred weightings are created, and the macros 122 of FIG. 1 are assigned to a corresponding LBIST channel 602 based on the preferred weightings of the macros 122 of FIG. 1. For example, if four scan chains are determined to have a preferred weighting of 1/4 and LBIST channel 602a corresponds to a preferred weighting of 1/4, then spreading network 606a would include a preferred weighting of 1/4 (e.g., a 2-input AND-gate) between LFSR 604a and each scan chain 608a-608d, with test results captured in MISR 610a. If three scan chains are determined to have a preferred weighting of 63/64 and LBIST channel 602n corresponds to a preferred weighting of 63/64, then spreading network 606n would include a preferred weighting of 63/64 (e.g., a 6-input OR-gate) between LFSR 604n and each scan chain 608n-608p, with test results captured in MISR 610p.

Accordingly, with respect to the example of FIG. 6, the integrated circuit layout 124 of FIG. 1 includes weighted test paths 626a-626d to respectively apply the preferred weightings (i.e., 1/4) to the macros 122 of FIG. 1 embodied in the scan chains 608a-608d. The integrated circuit layout 124 of FIG. 1 also includes weighted test paths 626n-626p to respectively apply the preferred weightings (i.e., 63/64) to the macros 122 of FIG. 1 embodied in the scan chains 608n-608p in this example. The example continues for all unique preferred weightings in the DUT 112 of FIG. 1.

Figure 7:
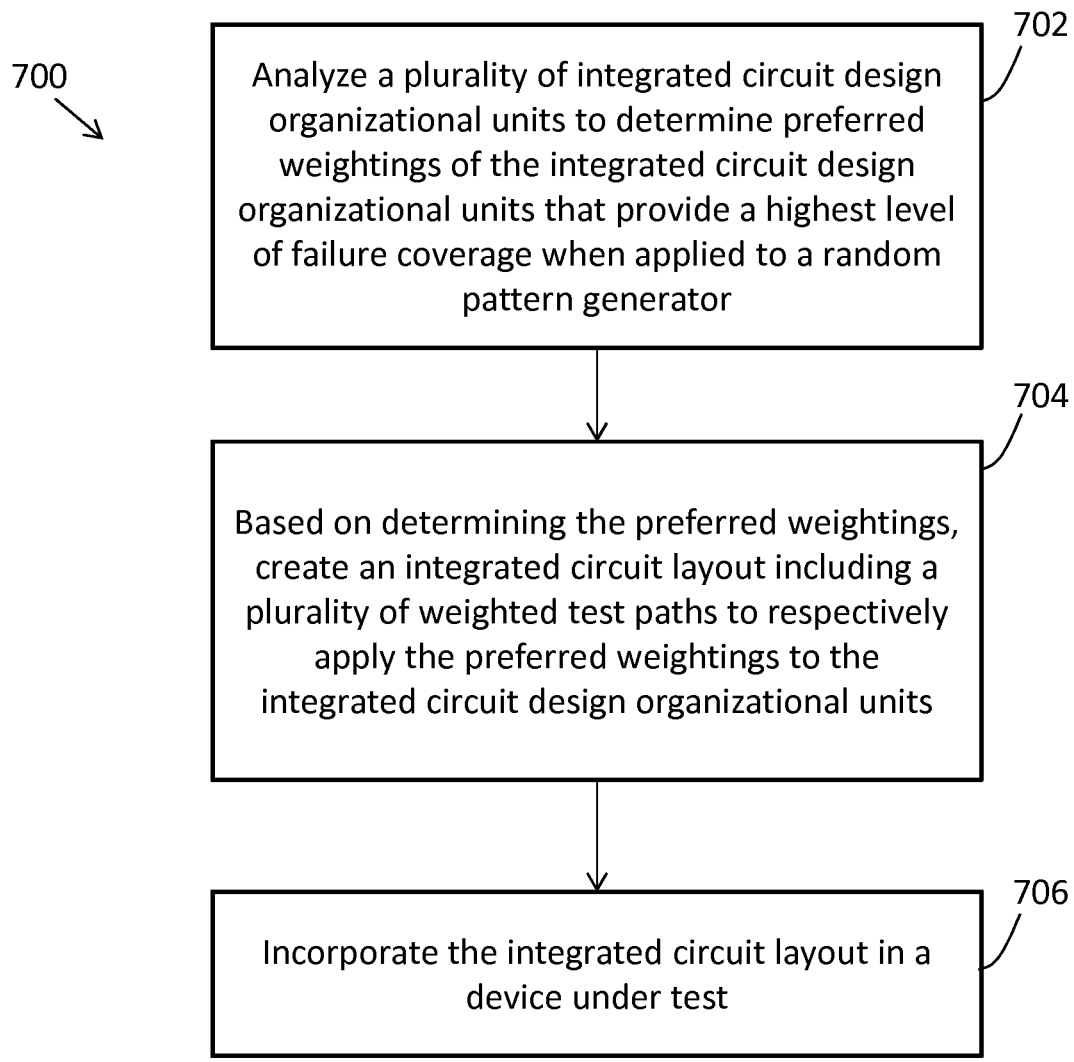
FIG. 7 depicts a process flow for implementing design-based weighting for logic built-in self-test in accordance with an embodiment.

FIG. 7 depicts a computer-implement process 700 for implementing design-based weighting for logic built-in self-test in accordance with an embodiment. The process 700 can be implemented by the IC development system 102 of FIG. 1 to incorporate one or more of the design structures 200-600 of FIGS. 1-6 into the DUT 112 of FIG. 1. The process 700 is described with respect to FIGS. 1-7.

At block 702, a plurality of integrated circuit design organizational units 118 are analyzed to determine preferred weightings of the integrated circuit design organizational units 118 that provide a highest level of failure coverage when applied to the random pattern generator 116. The analysis can be performed by the DFT analyzer 114. The integrated circuit design organizational units 118 may be analyzed as macros 122 prior to organizing the macros into STUMPS channels 120 or analyzed as STUMPS channels 120 after assignment of the macros 122 to the STUMPS channels 120.

At block 704, based on determining the preferred weightings, the processing circuit 104 creates an IC layout 124 that includes a plurality of weighted test paths to respectively apply the preferred weightings to the integrated circuit design organizational units 118. For example, the preferred weightings 324a-324n can be applied to STUMPS channels 314a-314n via weighted test paths 326a-326n. The preferred weightings 324a-324n can be assigned to multiplexer inputs 316a-316n for the weighted test paths 326a-326n. Connecting a common weight selection register 428 to at least two of the multiplexers 312a-312n can enable selection of the same multiplexer input position for the at least two of the multiplexers 312a-312n at a same time. At least one of the design files 110 can be modified to annotate the preferred weightings of the integrated circuit design organizational units 118 in the design files 110, e.g., at a macro level or STUMPS channel level. Where multiple LBIST channels 602a-602n are used, an LBIST channel 602a-602n can be assigned to each unique instance of the preferred weightings, and the macros 122 assigned to a corresponding LBIST channel 602a-602-n based on the preferred weightings of the macros 122. At block 706, the IC layout 124 is incorporated in the DUT 112.

Technical effects and benefits include design-based weighting for logic built-in self-test, where integrated circuit design organizational units are analyzed to determine preferred weightings, and based on the preferred weightings an integrated circuit layout is created including a plurality of weighted test paths to respectively apply the preferred weightings to the integrated circuit design organizational units.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

Figure 8:
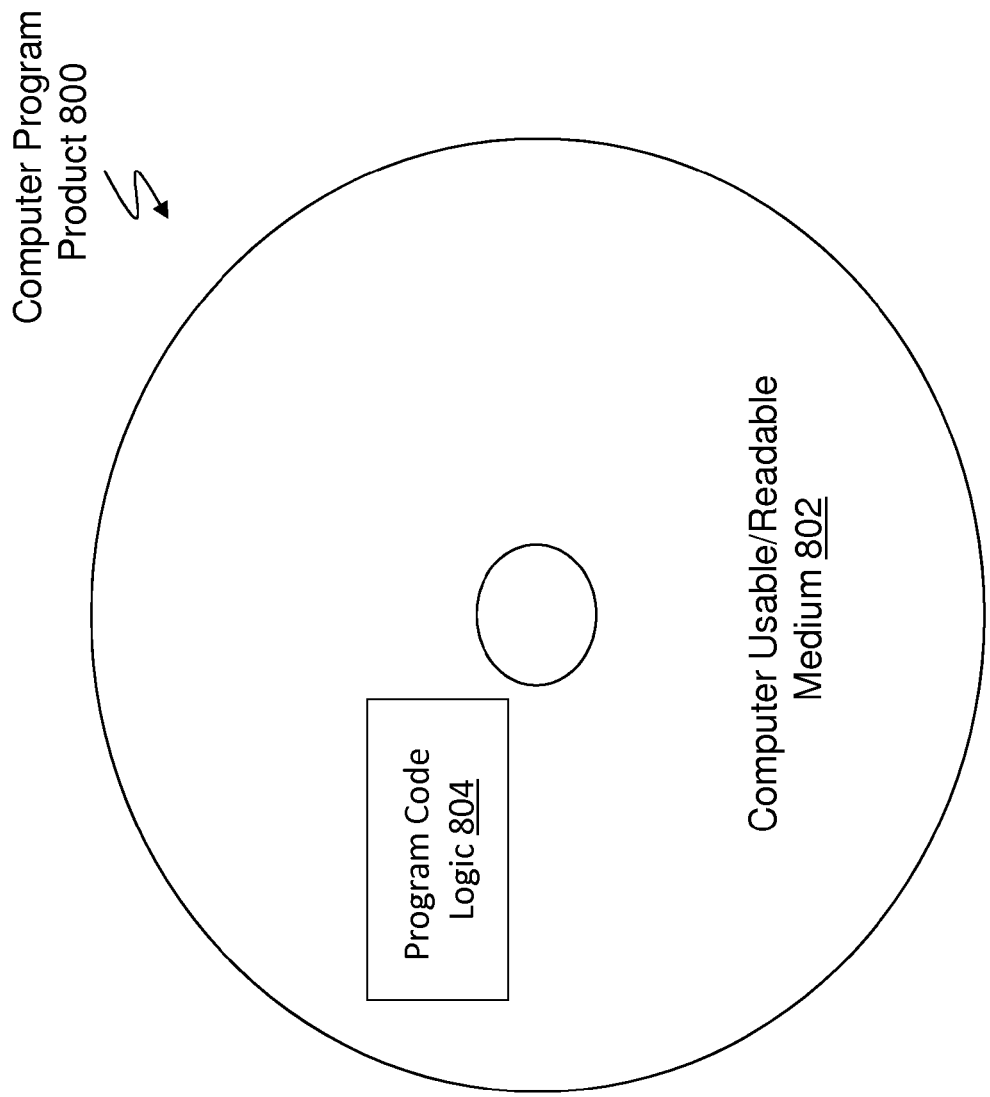
FIG. 8 illustrates a computer program product in accordance with an embodiment.

Referring to FIG. 8, one or more aspects of embodiments can be included in an article of manufacture (e.g., one or more computer program products 800) having, for instance, computer readable storage media 802. The media has embodied therein, for instance, computer readable program code (instructions) 804 to provide and facilitate the capabilities of embodiments. The article of manufacture can be included as a part of a computer system or as a separate product. For example, the memory system 106 of FIG. 1 can be or include an embodiment of the computer readable storage media 802, where the IC development tools 108 of FIG. 1 are embodied as computer readable program code 804 for execution by the processing circuit 104 of FIG. 1.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
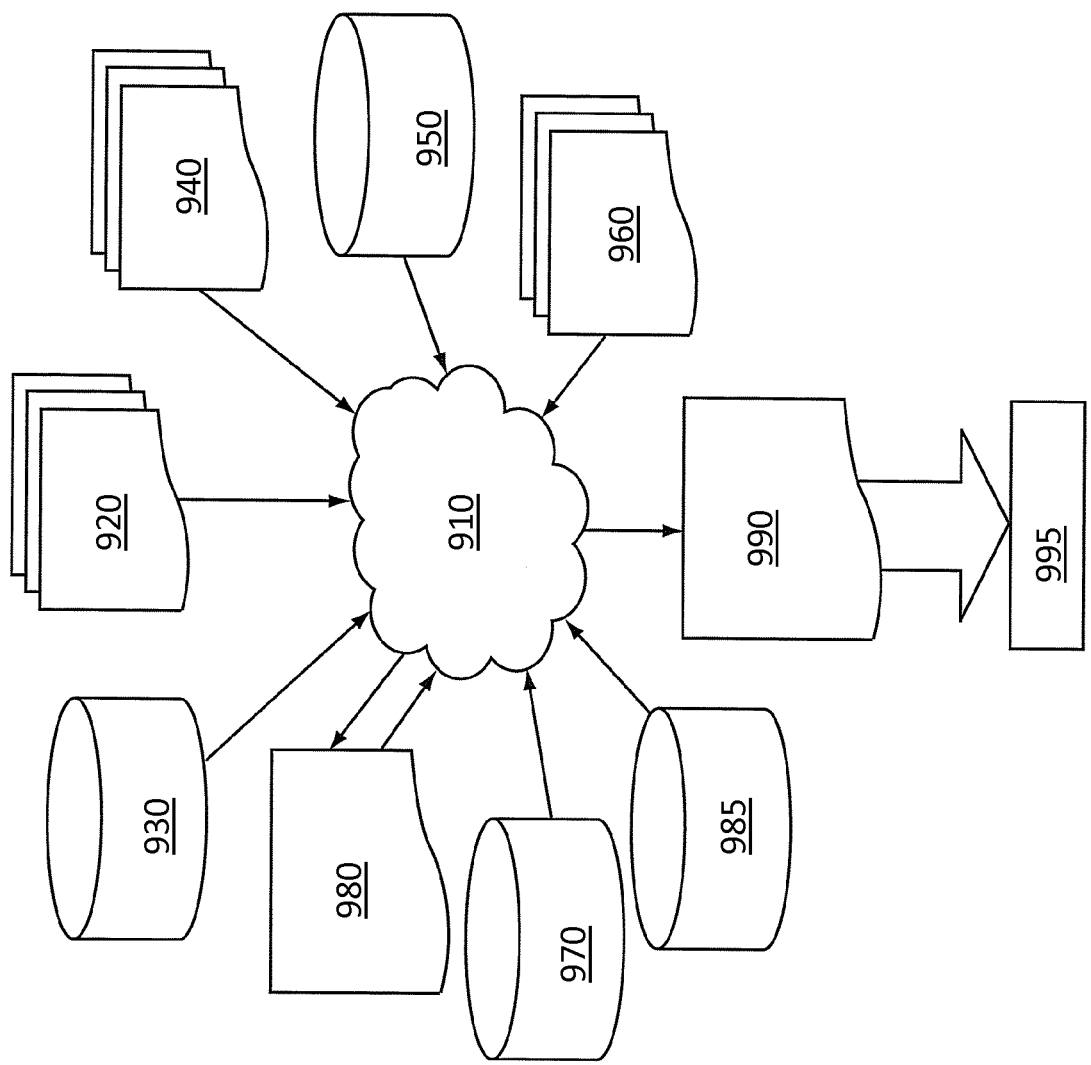
FIG. 9 is a flow diagram of a design process used in semiconductor design, manufacture, and/or test.

FIG. 9 shows a block diagram of an exemplary design flow 900 used for example, in semiconductor IC logic design, simulation, test, layout, and manufacture, such as incorporating the IC layout 124 of FIG. 1 into the DUT 112 of FIG. 1. Design flow 900 includes processes, machines and/or mechanisms for processing design structures or devices to generate logically or otherwise functionally equivalent representations of the design structures and/or devices described above and shown in FIGS. 1-6. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 9 illustrates multiple such design structures including an input design structure 920 that is preferably processed by a design process 910. Design structure 920 may be a logical simulation design structure generated and processed by design process 910 to produce a logically equivalent functional representation of a hardware device, e.g., design structures 200-600 of FIGS. 2-6 from IC layout 124 of FIG. 1 for DUT 112 of FIG. 1. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer.

When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-6. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++. The design structure 920 may be stored in the memory system 106 of FIG. 1 and/or on the computer program product 800 of FIG. 8.

Design process 910 preferably employs and incorporates hardware and/or software modules for synthesizing, translating, or otherwise processing a design/simulation functional equivalent of the components, circuits, devices, or logic structures shown in FIGS. 1-6 to generate a Netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including Netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-6. In one embodiment, design structure 990 may comprise a compiled, executable HDL simulation model that functionally simulates the devices shown in FIGS. 1-6.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-6. Design structure 990 may then proceed to a stage 995 where, for example, design structure 990: proceeds to tape-out, is released to manufacturing, is released to a mask house, is sent to another design house, is sent back to the customer, etc. to finalize the DUT 112 of FIG. 1.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for implementing design-based weighting for logic built-in self-test (LBIST), the computer program product comprising:
a non-transitory storage medium readable by a processing circuit and storing instructions for execution by the processing circuit for performing a method comprising:
analyzing, by the processing circuit, a plurality of integrated circuit design organizational units to determine preferred weightings of the integrated circuit design organizational units that provide a highest level of failure coverage when applied to a random pattern generator;
based on determining the preferred weightings, creating, by the processing circuit, an integrated circuit layout comprising a plurality of weighted test paths to respectively apply the preferred weightings to the integrated circuit design organizational units, wherein the integrated circuit design or organizational units are assignable to perform LBIST using the preferred weightings as design-based weighting within a device under test; and
incorporating the integrated circuit layout in the device under test.

2. The computer program product of claim 1, wherein the instructions for execution by the processing circuit are further configured to assign the preferred weightings to multiplexer inputs for the weighted test paths.

3. The computer program product of claim 2, wherein the multiplexer inputs comprising the preferred weightings are assigned to a same multiplexer input position across a plurality of multiplexers such that selection of the same multiplexer input position for the multiplexers results in selecting the preferred weightings across the multiplexers.

4. The computer program product of claim 3, wherein the instructions for execution by the processing circuit are further configured to connect a common weight selection register to at least two of the multiplexers to enable selection of the same multiplexer input position for the at least two of the multiplexers at a same time.

5. The computer program product of claim 1, wherein each of the integrated circuit design organizational units is a Self-Test Using Multiple Signal Registers and Pseudo-Random Pattern Generators (STUMPS) channel comprising a scan chain assigned to a macro, and the analyzing is performed on a STUMPS channel basis.

6. The computer program product of claim 1, wherein the instructions for execution by the processing circuit are further configured to modify at least one design file to annotate the preferred weightings of the integrated circuit design organizational units in the at least one design file.

7. The computer program product of claim 1, wherein the integrated circuit design organizational units are macros, and the instructions for execution by the processing circuit are further configured to assign an LBIST channel for each unique instance of the preferred weightings and assign the macros to a corresponding LBIST channel based on the preferred weightings of the macros.

8. A computer-implemented method for implementing design-based weighting for logic built-in self-test (LBIST), the method comprising:
analyzing, by a processing circuit, a plurality of integrated circuit design organizational units to determine preferred weightings of the integrated circuit design organizational units that provide a highest level of failure coverage when applied to a random pattern generator;
based on determining the preferred weightings, creating, by the processing circuit, an integrated circuit layout comprising a plurality of weighted test paths to respectively apply the preferred weightings to the integrated circuit design organizational units, wherein the integrated circuit design organizational units are assignable to perform LBIST using the preferred weightings as design-based weighting within a device under test; and
incorporating the integrated circuit layout in the device under test.

9. The computer-implemented method of claim 8, further comprising:
assigning the preferred weightings to multiplexer inputs for the weighted test paths.

10. The computer-implemented method of claim 9, wherein the multiplexer inputs comprising the preferred weightings are assigned to a same multiplexer input position across a plurality of multiplexers such that selection of the same multiplexer input position for the multiplexers results in selecting the preferred weightings across the multiplexers.

11. The computer-implemented method of claim 10, further comprising:
connecting a common weight selection register to at least two of the multiplexers to enable selection of the same multiplexer input position for the at least two of the multiplexers at a same time.

12. The computer-implemented method of claim 8, wherein each of the integrated circuit design organizational units is a Self-Test Using Multiple Signal Registers and Pseudo-Random Pattern Generators (STUMPS) channel comprising a scan chain assigned to a macro, and the analyzing is performed on a STUMPS channel basis.

13. The computer-implemented method of claim 8, further comprising:
modifying at least one design file to annotate the preferred weightings of the integrated circuit design organizational units in the at least one design file.

14. The computer-implemented method of claim 8, wherein the integrated circuit design organizational units are macros, and the method further comprises assignin an LBIST channel for each unique instance of the preferred weightings and assign the macros to a corresponding LBIST channel based on the preferred weightings of the macros.

* * * * *